United States Patent [19]

DeWees

[11] Patent Number: 5,107,945

[45] Date of Patent: Apr. 28, 1992

[54] PROCESS FOR COLLECTING AND WEIGHING SOLIDS AND PARTICULATE EMISSIONS

[75] Inventor: William G. DeWees, Cary, N.C.

[73] Assignee: Entropy Environmentalists, Inc., Research Triangle Park, N.C.

[21] Appl. No.: 572,255

[22] Filed: Aug. 27, 1990

[51] Int. Cl.[5] .................. G01G 23/14; G01N 31/00
[52] U.S. Cl. .................................. 177/1; 177/165; 73/28.01
[58] Field of Search ............... 73/28.01–28.06; 177/165, 1

[56] References Cited

U.S. PATENT DOCUMENTS

| | | | |
|---|---|---|---|
| 3,686,835 | 8/1972 | Strange et al. | 73/28.04 X |
| 3,957,469 | 5/1976 | Nebash | 73/28.04 X |
| 4,391,338 | 7/1983 | Patashnick et al. | 177/210 FP |

Primary Examiner—George H. Miller, Jr.
Attorney, Agent, or Firm—Rhodes, Coats & Bennett

[57] ABSTRACT

The present invention is a gravimetric procedure for the measurement of solids and/or liquids in a statically dissipated Teflon bag. The procedure enhances the accuracy of presently accepted laboratory methods because the sample container weighs little relative to the sample and the bag is an inert surface which is not activated or contaminated. Solids placed in the Teflon bag can be treated, weighed, and stored in the bag without any sample transfer. Liquids placed in the Teflon bag are treated and weighed without transfer. This procedure has been applied particularly to laboratory procedures for measurement of particulate samples collected from effluent gas streams during environmental testing.

4 Claims, 4 Drawing Sheets

PROCESS FOR COLLECTING AND WEIGHING SOLIDS AND PARTICULATE EMISSIONS

FIELD OF THE INVENTION

The present invention relates to processes for measuring particulate, solids, and liquids taken from industrial effluent air streams, and more particularly to a process for collecting, containerizing, and weighing particulate emissions.

The present invention is a procedure for gravimetric measurement of liquid or solid substances and was devised in an effort to provide more accurate weighings of small particulate samples taken from industrial effluent air streams during environmental testing. The procedure evolved from, but is not limited to, laboratory analysis of the particulate samples captured upon filter media and suspended in solvent rinses of the sampling equipment. A more accurate gravimetric weighing procedure has a general profound value in any technical setting, but accuracy is particularly crucial in fields such as environmental testing, where test results determine compliance or violation of regulations. Violation of these regulations not only can have grave impact upon the environment, but also perceived violation carries stern and costly penalties. Low-biased measurements of highly potent and toxic emissions could result in the continued release of harmful concentrations of toxics into the atmosphere, possibly causing irreversible damage to the environment and the population.

BACKGROUND OF THE INVENTION

Conventional methods used to sample industrial effluent aerosols (i.e. gas and particulate mixtures) require the insertion of a probe assembly into an opening in the duct or stack in order to withdraw a sample of the effluent gas stream. The withdrawn sample flows through the probe, into a sample line, and into an enclosed sample collection apparatus.

The specific configuration of the sampling equipment is prescribed in the methods contained in the Code of Federal Regulations, Title 40, Part 60 (40 CFR 60) and varies depending upon the sampling objective and applicable regulations. However, the essential configuration generally directs the aerosol sample through (in series) the sample probe, a filter, a series of impingers charged with reagents (usually liquid), and a vacuum line which leads to a pump and a gas metering instrument. At the end of this equipment train, the filtered gas sample is exhausted to the atmosphere.

Sample constituents are captured on the filter and in the impinger reagents. Particulate adhering to the walls of the sample probe and the front portion of the filter holder are recovered by rinsing with solvent. Recovered samples are delivered to the laboratory for analysis.

In standard laboratory procedures, each of the recovered sample components [(1) the filter and captured particulate, (2) the impinger reagents-optional, (3) and the solvent rinse] is transferred to a tared glass weighing dish and desiccated or otherwise treated. A sample is weighed at intervals until a constant weight is measured. For EPA Method 5, for example, a particulate filter sample is desiccated for 24 hours or oven dried. The sample is then weighed until a difference no greater than 0.5 mg or 1% of the sample weight (i.e., total weight less the tare weight) is measured between two weighings. The final sample weight is reported to the nearest 0.1 mg. It should be noted that small, below 20 milligrams, effluent particulate samples are common due to the excellent emissions control equipment now in use at many facilities and stringent emissions regulations. The sample and container are set aside in short term storage for several weeks until final reports have been received by the client. Samples to be stored for longer terms (sometimes 2 years or more) are transferred to selected plastic bags.

Within these standard procedures, some amount of sample weight measurement error is associated with the weights of the container (beaker) and sample. The weight of a typical 250 ml glass beaker (about 80–100 grams) is 4,000 to 5,000 times the weight of a 20-milligram particulate sample. Attempts to establish the particulate sample weight at ±10% accuracy must also be concerned with obtaining an accurate measurement of the beaker containing the sample. Even small errors in measurement of the total weight or beaker tare weight result in proportionally large variations relative to the contained 20-milligram sample. Measurement of the sample weight to ±10% would therefore be undermined. This significant burden upon accurate sample measurement is increased by unpredictable fluctuations in beaker weight resulting from activation of the beaker's glass surface.

Weight measurement error caused by contamination and activation of glass beakers is difficult to quantify. When beakers are cleaned for re-use, their surfaces are scraped and washed to remove sample materials. Sites on the large glass surface of the beaker become activated by reactions with cleaning solutions, mechanical cleaning, and samples. The adsorption, reaction, and desorption which occurs on these activated sites cause variable reactions with gases and particles in the laboratory atmosphere in unidentifiable and unpredictable ways. As a result, beaker weights can fluctuate, interfering with accurate or consistent measurement of the contained sample.

SUMMARY AND OBJECTS OF THE INVENTION

The present invention entails a "Teflon" bag method for measuring solids, liquids or particulate emissions that addresses the above discussed problems and which does in fact provide an accurate and convenient process for collecting and measuring solids, liquids or particulate emissions.

The present invention has two objects: (1) to improve the accuracy of gravimetric measurement of contained samples by improving the weight relationship of the sample to its container and by eliminating contamination and activation typical of glass container surfaces and (2) to provide a convenient and economic container for handling, treating, and weighing solid or liquid substances and for storing solid substances, particularly laboratory samples which sometimes contain strong acids and solvents.

"Teflon", however, is a transparent, chemically inert material which is not subject to the aforementioned chemical interactions and activations which affect glass. Additionally, a Teflon bag is likely to weigh only about 6 grams (about 1/5 the weight of a beaker), increasing the potential for accurate measurements. The "Teflon" bag is a convenient vessel for sample containment because treatment, weighing, and sealed long-term storage can occur without transfer of the sample to any other containers, thus avoiding risk of sample loss. It is pliable and unbreakable, yet the bag material thickness and construction make it rigid enough to stand upright without additional support. The material will withstand heat treatment and long-term storage without deterioration. It is inexpensive enough to allow disposal of the bag after use at a lower cost than preparing a glass beaker for re-use. This also avoids the weighing accuracy and other technical problems associated with cleaning of the glass beakers.

BRIEF DESCRIPTIONS OF THE DRAWINGS

DETAILED DESCRIPTION OF THE INVENTION

Figure 1:
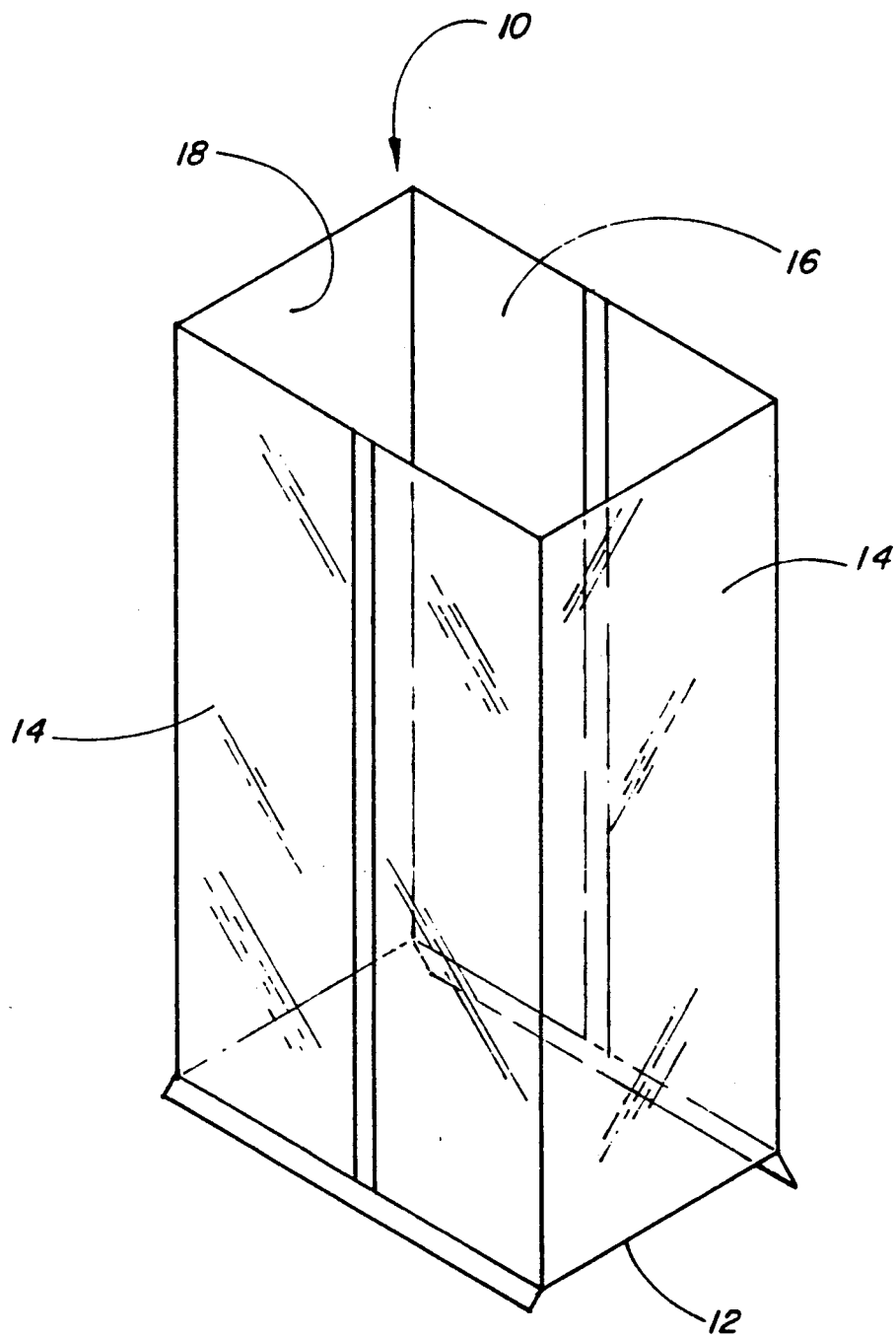
FIG. 1 is a perspective view of the "Teflon" bag utilized in the gravimetric process of the present invention.

The present invention entails a method and apparatus for collecting and weighing solids, liquids and particulate emissions. In carrying out this process, the present invention utilizes a "Teflon" bag shown in FIG. 1 and indicated generally by the numeral 10. "Teflon" is a registered trademark of the DuPont Company for fluorocarbon resins. The present invention contemplates that the "Teflon" bag can be constructed of any one of DuPont Company's "Teflon" resins, for example, PTEE, PFEP, and PFA. Typically, it is contemplated that the thickness of the "Teflon" stock material utilized to form the bag 10 would be in the range of 0.005 to 0.0075 inches, resulting in wall thicknesses from 0.002 to 0.008 inches in the finished product. For a description of various suitable "Teflon" resins, one is referred to the product catalog of Berghof/American, Concord, Calif., entitled *Berghof/American Products for Research and Industry*.

The "Teflon" bag 10 forming the present invention may be constructed in numerous useful shapes. Three examples of the various shapes are as follows: (1) circular cylindrical side walls with a seamless flat oval bottom, (2) circular cylindrical side walls with a flat rectangular bottom whose junction to the side walls is seamed to the exterior of the bag, and (3) rectangular cylindrical side walls with a flat, rectangular bottom whose junction to the side walls is seamed to the exterior of the bag. All of the "Teflon" bags 10 are opened at the top to allow access and desiccation. All bags are sufficiently rigid to prevent them from collapsing. With or without contents, the "Teflon" bag 10 is capable of remaining stable in an upright position. Although the "Teflon" material utilized for the bag 10, shown as a preferred embodiment in this disclosure, is flexible and pliable, the side wall structure is sufficiently rigid to enable the side wall to support itself and stand upright without additional support. This enables the entire bag 10 to be self-supporting and capable of standing upright without collapsing.

In utilizing the Teflon bag 10 of the present invention, it is important that any static charge associated with the Teflon bag 10 be dissipated prior to use. When the "Teflon" bag is charged with static electricity, the charge tends to interact electrically with the charges of other objects in close proximity. The resulting attraction or repulsion between a static charged "Teflon" bag 10 and an electronic weighing scale renders inconsistent weights, making a charged "Teflon" bag 10 unusable for weighing purposes.

The static charge problem can be overcome by (1) the installation of equipment to reduce static charges of the laboratory atmosphere, the weighing equipment and the lab personnel and (2) the use of procedures to dissipate static charges held by the "Teflon" bag 10 before each weighing and by the weigh scale balance pan and housing. Dissipation of any static charge associated with the "Teflon" bag 10 is highly desirable in practicing the present invention.

In practicing the present invention, standard gravimetric weighing procedures and equipment have been modified to accommodate the use of the "Teflon" bags 10, and additional laboratory equipment can be provided at the weighing station to assist in preventing or dissipating static charges of the area, the personnel, and the "Teflon" bags 10. Additional anti-static equipment installed in the laboratory includes a ceiling mounted pulse DC ionizer, a grounded anti-static floor mat upon which personnel stand, a grounded anti-static bench mat upon which all weighing equipment is placed, and an ionization pulse gun with an associated compressed gas cylinder. Ionization pulse guns generally comprise a light-weight, hand held compressed air gun designed to disperse a neutralizing gas composition onto an object for the purpose of dissipating static charge associated with that object. It is also preferred that laboratory personnel wear anti-static lab coats, gloves and booties and should remain standing on the grounded floor mat throughout the weighing procedure. The electronic weighing scale is also grounded.

For a wide variety of static control devices, one is referred to the product brochure of Static Control Services, Inc. of Palm Springs, Calif. and particularly its "pulse gun" which is a light-weight hand held compressed air gun designed to disperse a neutralizing gas composition which can be used in the present process to neutralize the static charge associated with the "Teflon" bag.

There are a number of preparation steps that are recommended for use with the "Teflon" bags 10 of the present invention and the gravimetric process disclosed herein.

The "Teflon" bag of the present invention is designed such that the actual structure of the bag can be scribed upon with an instrument such as a diamond tipped marking device. This enables each "Teflon" bag to have a unique identification code actually scribed on the bag structure itself. The "Teflon" bag 10 can also be washed with a non-phosphate detergent, rinsed with distilled water, then rinsed with an appropriate solvent. During the washing and rinsing process, the bags are manually manipulated, coaxing them from the original flattened condition to a three-dimensional upright form. After reshaping, the bags are capable of standing unaided on their flat bottoms. The ionization pulse gun is used to neutralize the static charge of each bag, after which each bag is tare-weighed, and each code and corresponding tare-weight are recorded.

Now viewing the weighing procedure, recovered samples are removed from the field container and transferred to a prepared "Teflon" bag 10 in the same way that the samples were formally transferred to glass beakers. After desiccation and appropriate treatment of the sample, "Teflon" bags 10 containing samples are transported to the weighing station. Weighing personnel are properly attired in anti-static lab coats, booties and gloves and are standing on a ground anti-static floor mat. The ionizing pulse gun is also used to neutralize the static charge of the weigh scale pan and housing after 2 to 3 weighings.

When the samples are ready for storage, the top of the "Teflon" bag may be folded over and fastened or pressed together and may be heat sealed to preserve the sample.

Figure 2:
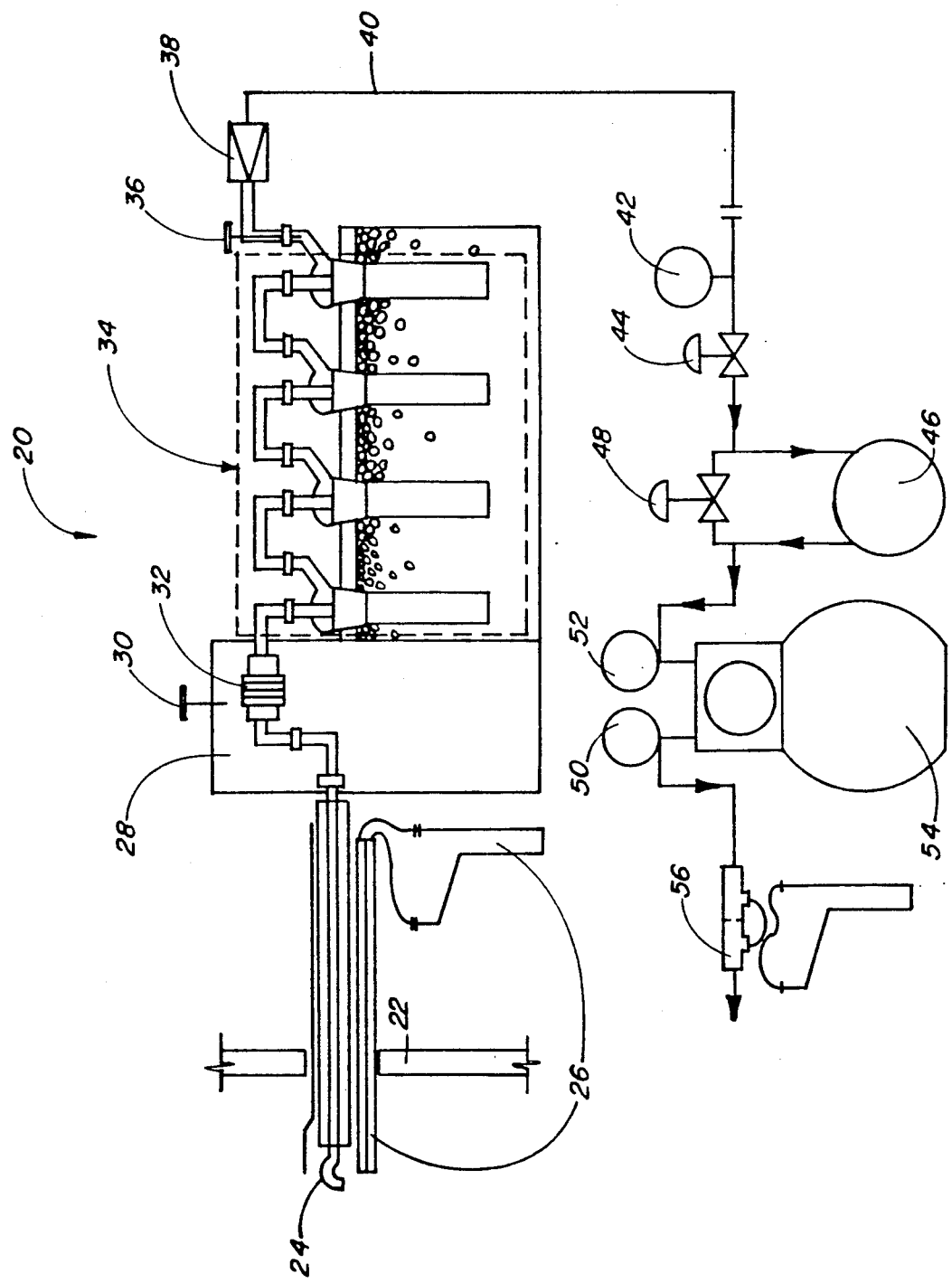
FIG. 2 is a schematic illustration of an air sampling train illustrating the collection of particulate passing through an exhaust stack.

The present invention utilizes the "Teflon" bag 10 to receive and hold solids, liquids and particulate matter. To illustrate the use of the "Teflon" bag 10, an example of a process for collecting particulate emissions is disclosed herein, and particularly illustrated in FIG. 2. Referring to FIG. 2, it is seen that there is provided a sampling unit or train indicated generally by the numeral 20 that is mounted adjacent to an exhaust stack 22 through which particulate emissions move. Such sampling trains 20 are conventional in air pollution testing processes. For the sake of a unified and complete understanding of such a process, the following discussion will deal with the conventional sampling train 20 and the method of collecting particulate emissions passed through an exhaust stack 22.

Viewing the sampling train 20, it is seen that a probe 24 extends through an opening formed in the exhaust stack wall 22. The probe extends into a heated compartment that houses a filter 32. Also inserted through the opening within the exhaust stack wall are a pitot tube and manometer 26. A thermometer 30 is provided for measuring the temperature within the compartment. Filter 32 is communicatively connected to an exiting line that leads from the compartment 28 that is in turn connected to an impinger section indicated generally by the numeral 34. The purpose of an impinger section is usually to determine the stack gas moisture content. It is appreciated that the impinger section 34 shown in FIG. 2 could be replaced by an equivalent condenser. Gas passing through the respective impingers exits the impinger section 34 and passes through a check valve 38 and on through vacuum line 40 which leads to a vacuum gauge 42 and a main valve 44. Downstream from the main valve 44, within vacuum line 40, is an air tight pump 46 that includes a by-pass valve 48 connected in parallel therewith. Downstream from the pump 46 is a dry gas meter 54 that includes a pair of thermometers 50 and 52 that are stationed about the inlet and outlet sides of the gas meter 54. Finally, gas passing from the gas meter 54 exits through an orifice 56. That essentially describes the basic structure of a conventional sampling train 20 that is used in collecting particulate emissions from an exhaust stack. As pointed out above, the sampling train indicated generally by the numeral 20 and shown in FIG. 2 is conventional.

In collecting particulate emissions, a part of the aerosol passing up the exhaust stack 22 enters the probe 24. The aerosol sample entering the probe 24 is directed through the probe 24, into the heated container 28 and the filter 32 therein. As the sample moves through this portion of the sampling train, particulate in the aerosol mixture is collected on the filter 32, and, in addition to that, some of the particulate associated with the sample collects along the wall structure of the probe and in the line between the probe inlet and the filter 32. The sample continues to move through the filter 32 and through the impinger section 34 and on through the vacuum line 40 and the various components connected in the vacuum line 40 between the impinger section 34 and the orifice 56.

Figure 3:
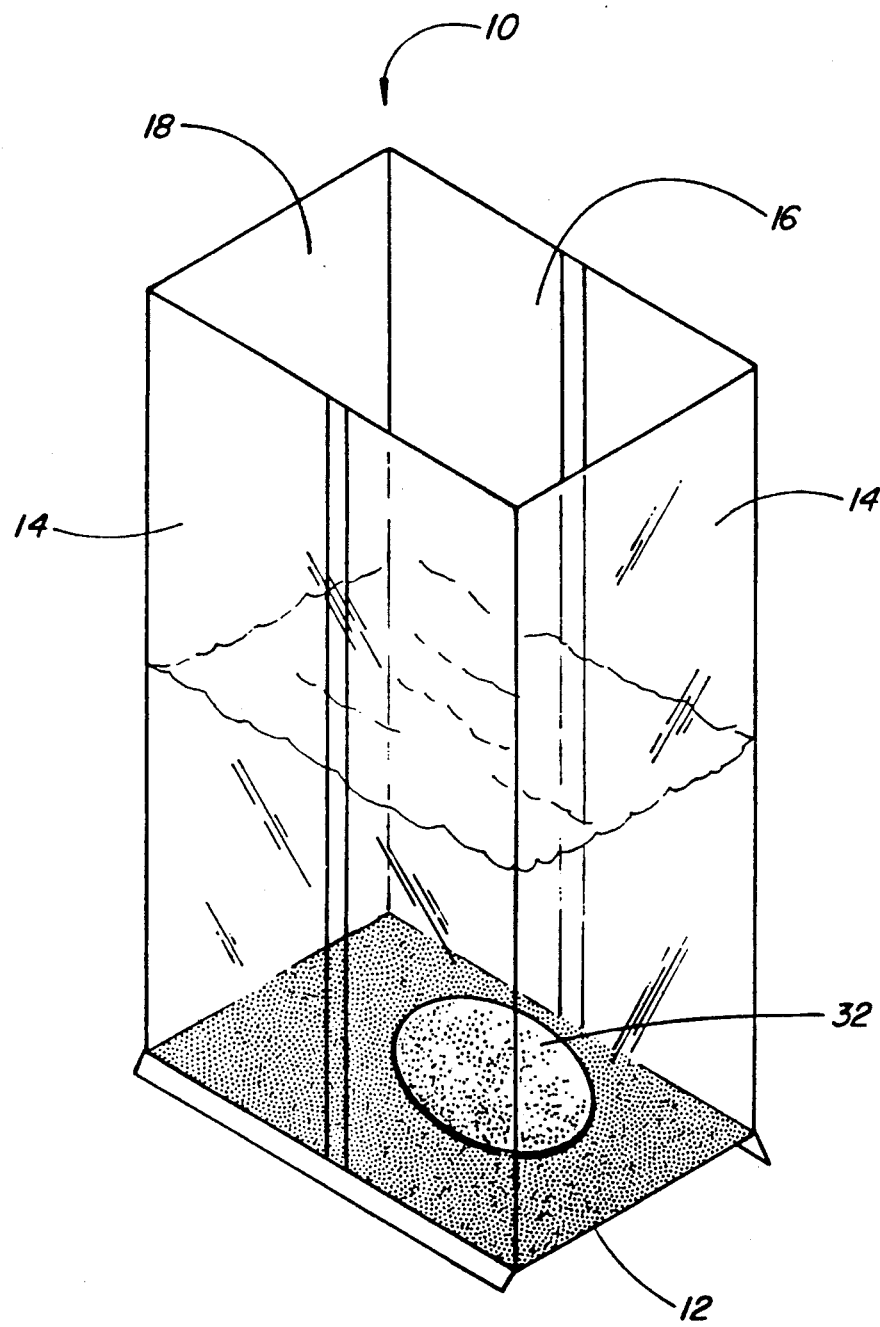
FIG. 3 is a perspective view of the "Teflon" bag including a filter taken from the air sampling train, particulate, and an evaporative solvent solution.

To determine the weight of the particulate emissions collected within the sampling train, the filter 32 (which generally includes a substantial portion of the total particulate collected) is removed from the sampling train and placed within the "Teflon" bag 10. See FIG. 3. Next, the particulate remaining within the probe 24 and in the line between the probe 24 and the filter 32 is removed by flushing the same with a solvent solution such as acetone. In particular, the solvent solution is channeled through the probe and any associated connecting line, and in the process the collected particulate is rinsed from the probe and associated connecting line and is placed within a collecting vessel such as a beaker or even the "Teflon" bag 10 (FIG. 3). In any event, a portion of the solvent solution and all of the particulate removed from the probe 24 and its associated lines is eventually transferred into the "Teflon" bag 10. Thus, the particulate emissions collected are now contained in the "Teflon" bag 10.

Figure 4:
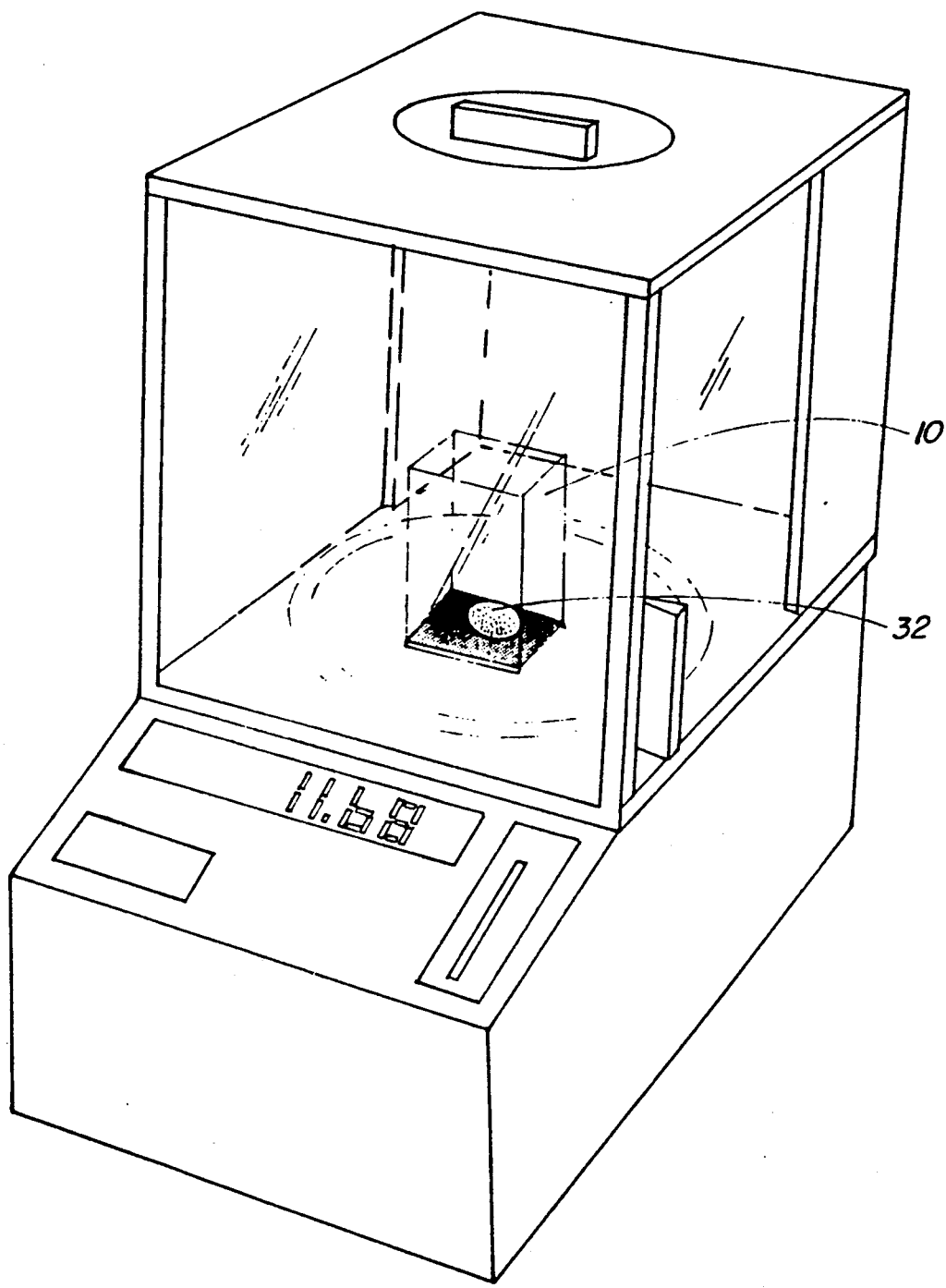
FIG. 4 is a perspective view of the "Teflon" bag and its contents being weighed on an analytical balance.

Prior to connecting the filter 32 within the sampling train 20, the weight of the filter is obtained by weighing it on a highly sensitive analytical balance (FIG. 4). In addition, prior to placing any particulate within the "Teflon" bag 10, the bag 10 itself was weighed in a completely empty state on a highly sensitive analytical balance. Therefore, it is appreciated that after the solvent solution, acetone in the example being described, has evaporated, then the total weight of the particulate collected can be determined by weighing the "Teflon" bag 10 with the filter 32 and the particulate left within the "Teflon" bag itself 10 after the acetone has completely evaporated. In FIG. 4, it is seen that the "Teflon" bag 10, including the filter 32 and particulate, is disposed on an analytical balance for purposes of weighing the "Teflon" bag 10 and its contents. Note that the "Teflon" bag 10 is not finally weighed until all of the solvent solution, shown in FIG. 3, has evaporated. In particular, the total weight of the particulate collected can be determined by subtracting the initial weight of the filter 32 and the empty "Teflon" bag from the final weight of the "Teflon" bag including the filter 32, the particulate collected within the filter 32 and the remaining particulate left within the bag.

The above process has described an example of the "Teflon" bag 10 being utilized to measure particulate emissions associated with an exhaust stack environment. However, the "Teflon" bag 10 of the present invention can be utilized in a wide variety of gravimetric processes. The same advantages discussed above apply in other gravimetric applications, that is, a favorable percentage weight error (or relative error) results due to the relatively light weight and inert nature of the "Teflon" bag 10.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A highly accurate gravimetric process for weighing collected solids, comprising: collecting solids, after the solids have been collected transferring and containerizing the collected solids into a light weight "Teflon" receptacle having a known weight, electrically neutralizing the "teflon" receptacle and weighing the "Teflon" receptacle and the containerized solids such that the weight of the solids may be readily determined.

2. The process of claim 1 wherein the step of transferring and containerizing the collected solids includes the step of transferring and containerizing the collected solids into a lightweight "Teflon" bag.

3. A highly accurate gravimetric process for measuring particulate emissions, comprising:

a) separating and collecting particulate being carried within a gas stream;
b) after the solids have been collected transferring and containerizing the collected particulate into a relatively light weight "Teflon" receptacle of known weight;
c) removing static associated with the "Teflon" receptacle; and
d) weighing the particulate while containerized in the "Teflon" receptacle, thereby allowing the weight of the particulate to be readily determined.

4. The process of claim 3 wherein the step of transferring and containerizing the collected solids includes the step of transferring and containerizing the collected solids into a lightweight "Teflon" bag.

* * * * *